United States Patent [19]
Lamel et al.

[11] 3,900,827
[45] Aug. 19, 1975

[54] TELEMETERING SYSTEM FOR OIL WELLS USING REACTION MODULATOR

[75] Inventors: Arthur E. Lamel, Arcadia; William D. Squire; Harper J. Whitehouse, both of San Diego, all of Calif.

[73] Assignee: American Petroscience Corporation, Bakersfield, Calif.

[22] Filed: Sept. 12, 1973

[21] Appl. No.: 396,411

Related U.S. Application Data

[62] Division of Ser. No. 113,147, Feb. 8, 1971, Pat. No. 3,790,930.

[52] U.S. Cl........... 340/18 NC; 340/18 LD; 175/40; 175/50; 166/113
[51] Int. Cl............................................. G01v 3/18
[58] Field of Search ..... 340/18 LD, 18 NC; 175/40, 175/50; 166/113; 181/5 AG, 5 RD, 5 MW; 73/70.1, DIG. 2, DIG. 6

[56] References Cited
UNITED STATES PATENTS
3,588,804   6/1971   Fort............................... 340/18 NC

FOREIGN PATENTS OR APPLICATIONS
197,198   6/1966   U.S.S.R............................... 73/70.1

OTHER PUBLICATIONS
Eastman, "Controlled Acceleration Devices," 3/3/58, pp. 75–80, Product Engineering.
Bornes et al., "Passhands for Acoustic...Drill String," 1972, pp. 1606–1608, J.A.S.A., Vol. 51, No. 5 (Part 2).

*Primary Examiner*—Maynard R. Wilbur
*Assistant Examiner*—N. Moskowitz
*Attorney, Agent, or Firm*—Forrest J. Lilly

[57] ABSTRACT
An acoustic communication method and system for transmitting information through a well bore drill string or other pipe by establishing in the pipe modulated torsional acoustic waves, preferably of zero order, which contain the information to be transmitted and travel from a signal transmitting station to a signal receiving station spaced along the pipe, and for demodulating the modulated waves arriving at the receiving station to recover the transmitted information. The modulated waves may be established in the pipe either by driving the pipe in torsional oscillation and modulating the resulting torsional acoustic waves in the pipe at the transmitting station or by launching modulated torsional waves through the pipe at the transmitting station. In its principal application, the invention is utilized to monitor selected well drilling parameters, such as temperature, formation pressure, formation porosity, drill string orientation, and/or to operate devices with the well bore. Primary advantages of the invention are reduced acoustic transmission losses from acoustic coupling to the drilling fluid and well bore wall and the ability to transmit information while drilling is in progress. According to the preferred practice of the invention, when monitoring drilling parameters, the torsional acoustic waves are launched downwardly through the drill string from the surface by exciting the upper end of the string in a zero order torsional acoustic oscillation at frequencies within the base band of the drill string acoustic transmission characteristics so as to minimize attenuation of the acoustic waves by the couplings between the drill string pipe sections. These torsional acoustic waves are modulated at a subsurface signal-transmitting station along the drill string by use of reaction modulation and returned back through the string to a surface signal-receiving station where the modulated waves are demodulated to recover the transmitted information.

12 Claims, 16 Drawing Figures

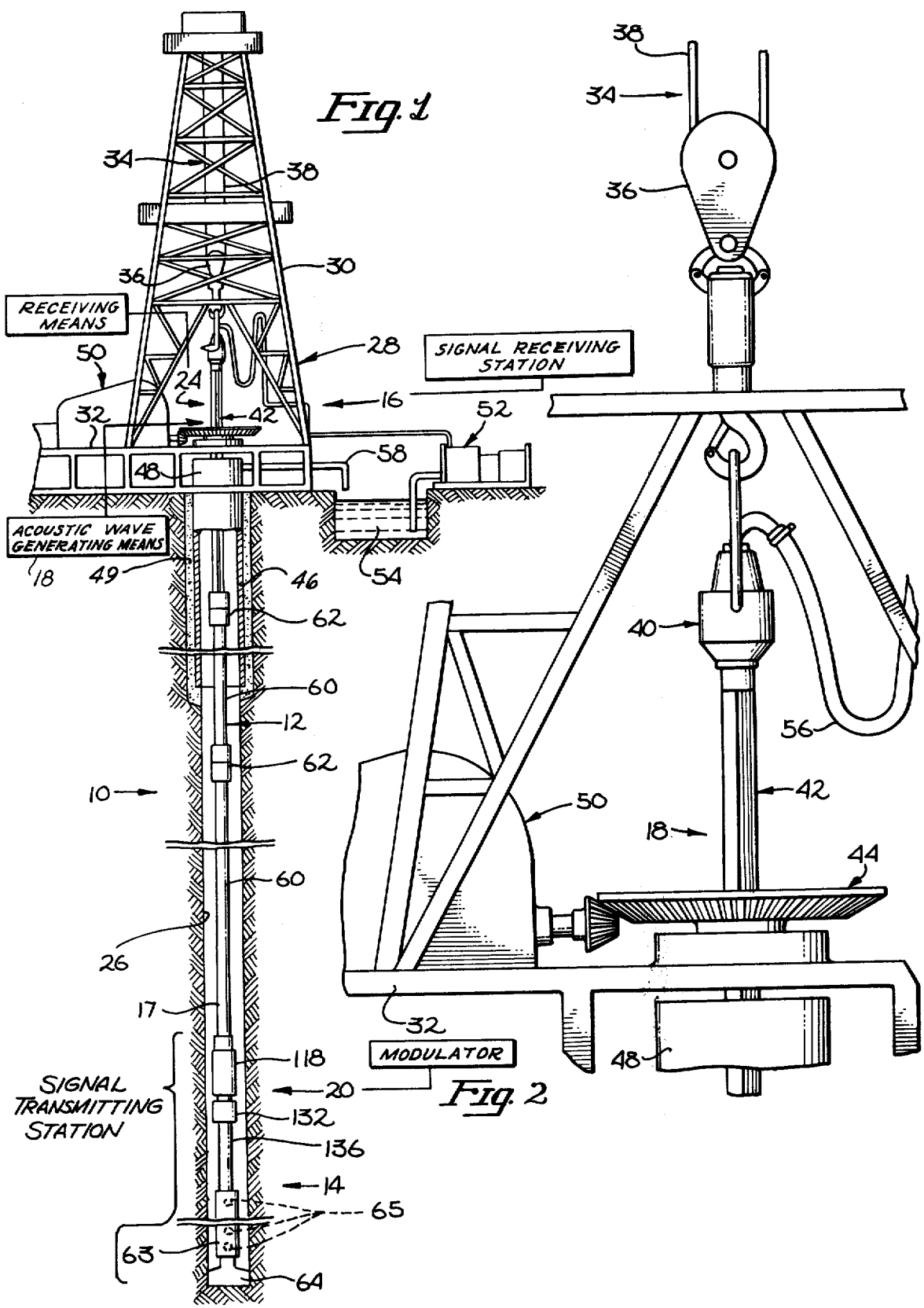

PATENTED AUG 19 1975 3,900,827

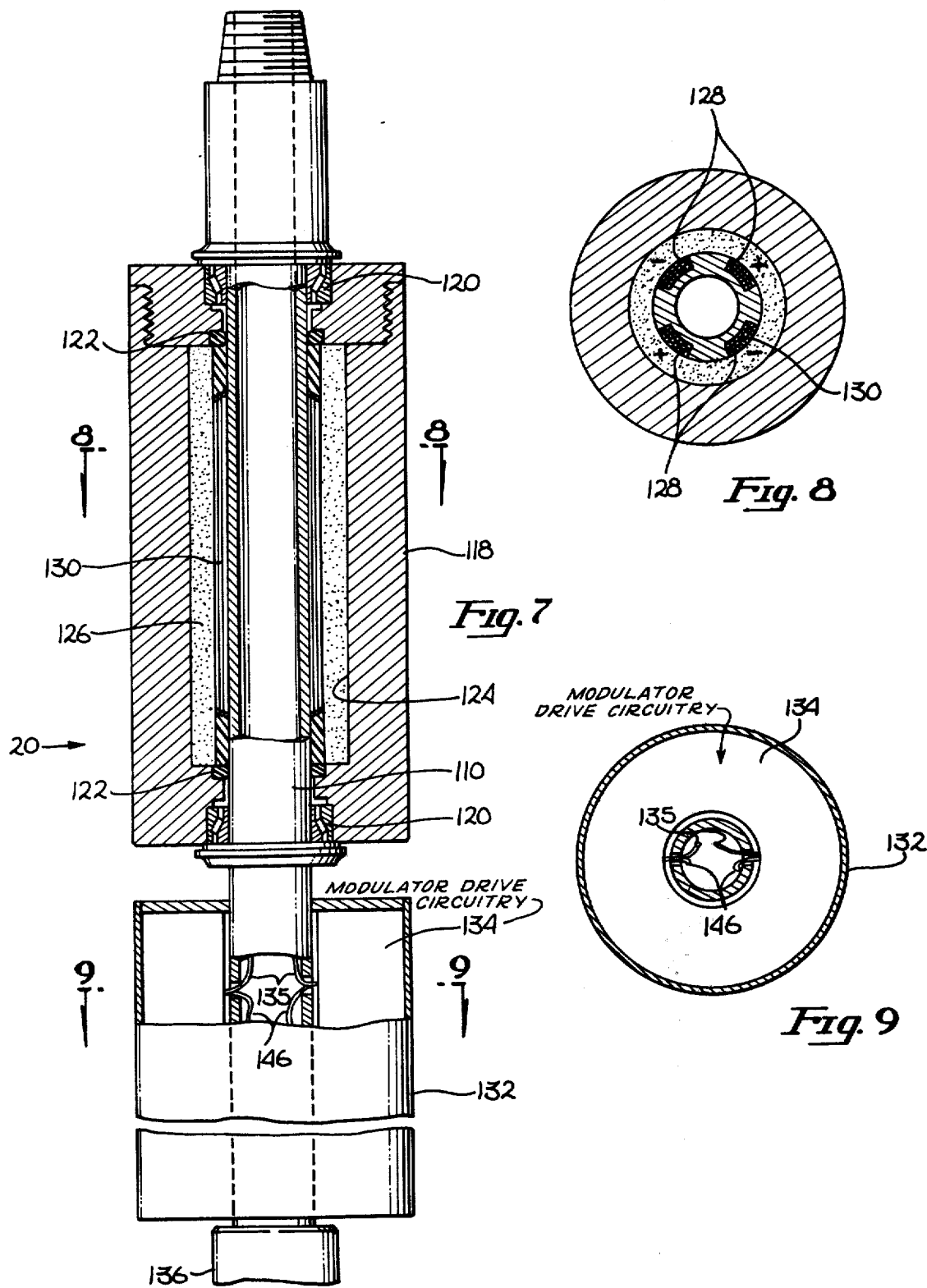

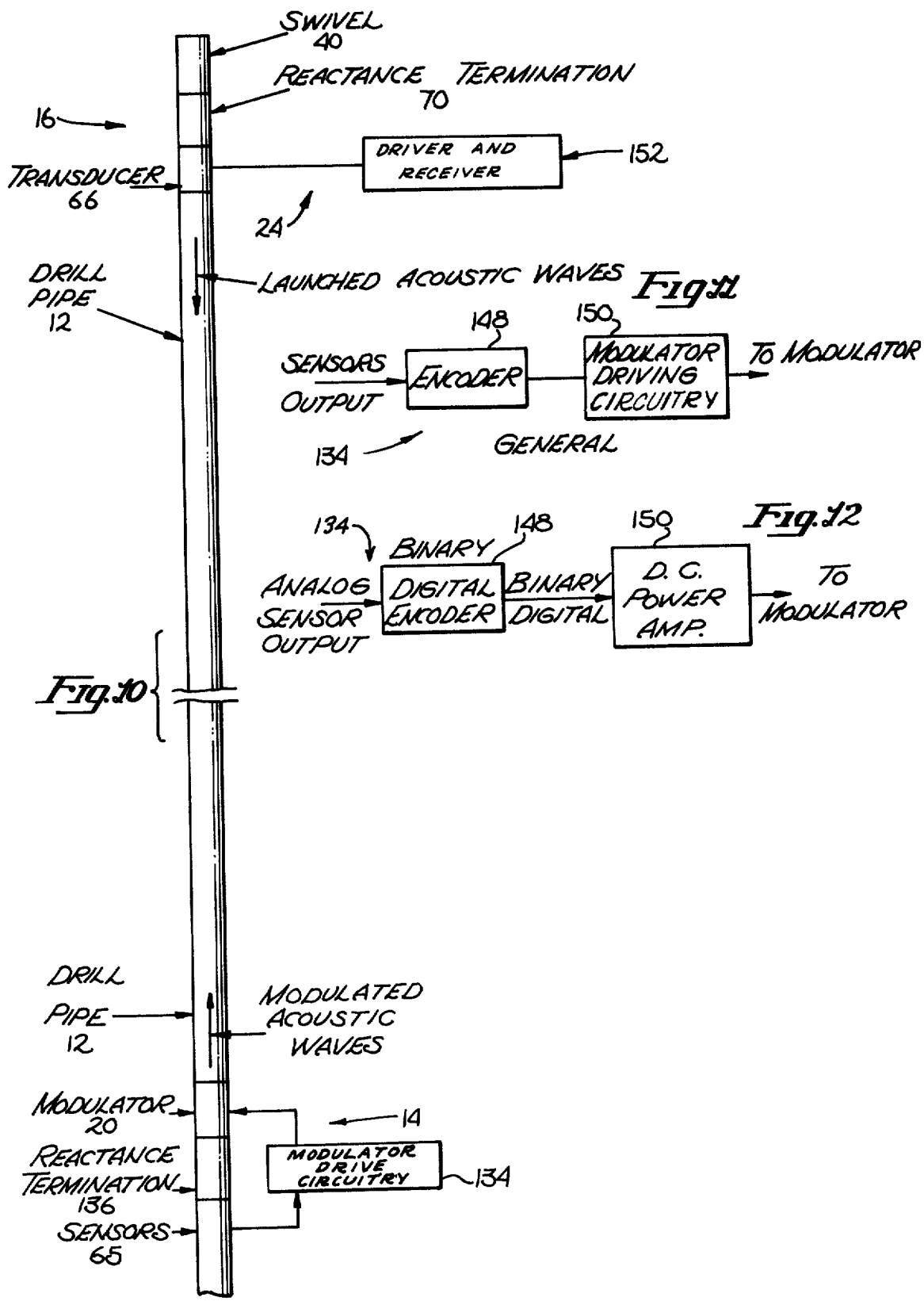

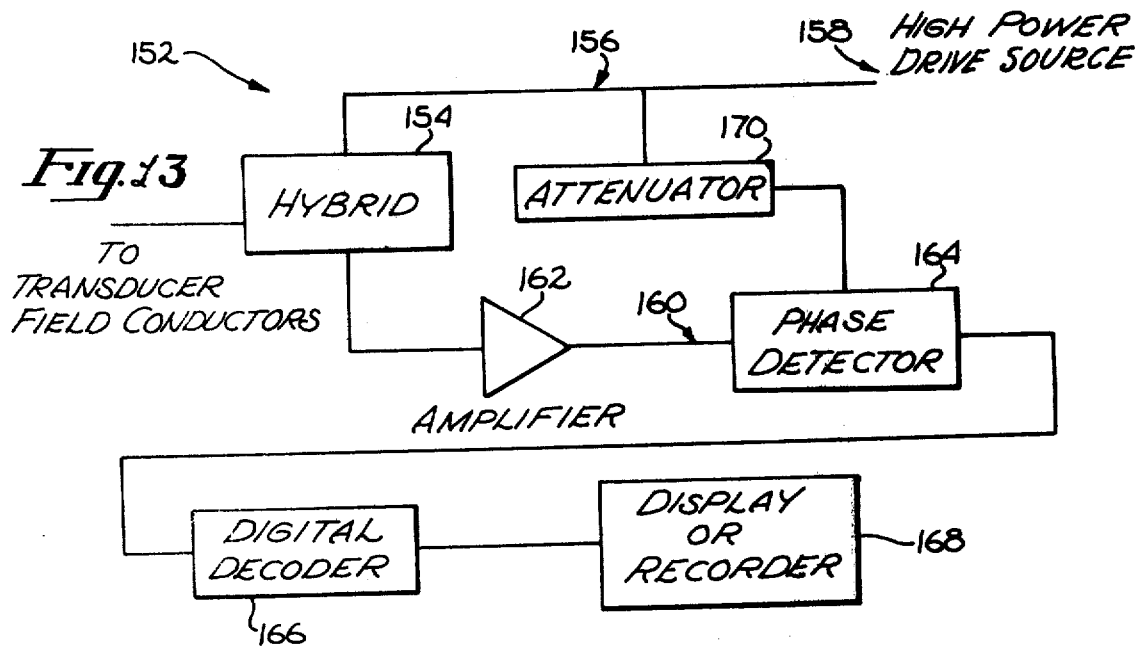

TELEMETERING SYSTEM FOR OIL WELLS USING REACTION MODULATOR

RELATED APPLICATION

This application is a division of our parent application, Ser. No. 113,147, filed Feb. 8, 1971 an entitled "Telemetering System for Oil Wells", now U.S. Pat. No. 3,790,930

BACKGROUND OF THE INVENTION

1. Field of the Invention

This invention relates generally to the art of transmitting telemetric and control information through a hollow well bore drill string or other pipe.

2. Description of the Prior Art

As will appear from the ensuing description, the present acoustic communication method and system may be employed to transmit information between two points of any pipe having an intervening length capable of sustaining and transmitting acoustic waves, preferably torsional acoustic waves, and particularly torsional waves of zero order. However, the principal application of the invention involves transmission of such acoustic waves modulated by telemetric and control information through the medium of a hollow drill string suspended within a well bore. Accordingly, the invention will be disclosed in connection with this particular application.

When drilling a well bore, it is desirable, if not essential, to monitor selected drilling parameters in the vicinity of the drill bit for the purpose of providing the drilling operator with sufficient information to properly control the drilling operation. Among the drilling parameters which provide valuable information to the drilling operator are temperature, formation pressure, formation porosity, and others. See our parent U.S. Pat. No. 3,790,930 for a full discussion.

The present invention proposes to improve on existing techniques for monitoring drilling parameters by providing a novel and improved acoustic communication method and system for transmitting telemetric information through a drill string. As will appear from the later description, such information transmission may occur while the drill string is stationary or rotating.

SUMMARY OF THE INVENTION

The present invention provides an improved acoustic communication method and system of the class described whose primary application involves transmission of telemetric and control information through a drill string suspended within a well bore from a surface drilling platform. For purpose of preliminary definition, the position from which modulated acoustic waves propagate is referred to as a signal-transmitting station, and the position at which the modulating waves are demodulated to recover the transmitted information is referred to as a signal receiving station. According to the present invention in its preferred form, acoustic waves in the drill string are modulated by a reaction modulator at the signal transmitting station in the well bore, under control of one or more sensors exposed to conditions to be monitored, so as to contain the information to be transmitted. These modulated waves are thence propagated through the drill string from the signal transmitting station to the signal receiving station, and are there demodulated to recover the transmitted information. The reaction modulator may be of several different types. In one preferred type, an inertial reaction mass is reactively coupled to the drill string and modulates the acoustic waves therein according to the degree of coupling of the mass to the drill string. The degree of this coupling is in turn under control of sensors exposed to variable well conditions which are to be monitored. A magnetostriction type will also be disclosed, and any suitable equivalent may be used.

Torsinal are superior to all other acoustic waves, such as longitudinal and flexural, for information through a drill string in that they couple less acoustic energy into the drilling fluid and wall of the well bore and thus permit efficient signal transmission through a greater length of drill string. In its broader scope, the invention contemplates the use of any acoustic waves which may be launched through a drill string and modulated to transmit information through the string. However, the preferred waves are torsional acoustic waves of zero order, that is, torsional acoustic waves characterized by pure rotation of the drill string about its central axis. Such zero order torsional waves are non-dispersive, i.e., the velocity of the waves is independent of their frequency, while most other acoustic wave forms are dispersive. Non-dispersive wave propagation through a drill string is highly desirable, and often essential to rapid signal transmission through the string for the reason that dispersion smears the information signals modulated on the waves.

Another important consideration is the direction of wave propagation through the drill string. Thus acoustic waves, preferably torsional, of zero order, may be launched downwardly through the drill string from the surface or upwardly through the drill string from the lower end of the string. In the preferred practice of the invention involving transmission of telemetric signals representing selected drilling parameters, torsional acoustic waves are launched downwardly through the drill string from the surface drilling platform to a sub-surface signal-transmitting station at the lower end of the drill string. The waves arriving at the lower transmitting station are modulated with the telemetric signals to be monitored and returned back through the drill string to a signal receiving station at the drilling platform where the modulated waves are demodulated to recover the transmitted signals. This method of wave propagation is permitted even in very deep wells because of reduction in acoustic transmission losses which results from the use of torsional acoustic waves, particularly torsional waves of zero order whose frequencies lie within the base band of the drill string acoustic transmission characteristics. Of course, for more shallow wells, or in more favorable situations, torsional waves may give way to other modes, such as have been attempted in the past, while utilizing other features of the present system.

A further matter of interest is the way in which the acoustic waves are generated within the drill string. According to this aspect, the invention contemplates two different methods of acoustic wave generation. One method involves utilization of the acoustic waves which are inherently produced in a rotating drill string during a drilling operation. In this regard, it is well-known that a drill string cutting bit, in the process of cutting into an earth formation, generates large quantities of noise which are transmitted along the drill string. Since the cutting motion is primarily a turning or twisting motion, a large component of this noise is torsional in character, i.e., consists of torsional acoustic waves. Such torsional waves are composed of relatively broadband components and narrow spectral lines or frequency bands generated by the teeth of a cutting bit and the gears in the mechanical drill string drive. The rotation generated torsional waves can be modulated at the bottom of the drill string in a manner to effectively transmit upwardly through the string selected torsional wave components representing information signals. These signals may be detected at the surface to recover the transmitted information.

The preferred method of acoustic wave generation contemplated by the invention however involves the use of a transducer, preferably a crossed-field magnetostrictive transducer, energized by an electrical driving signal of the proper frequencies to drive the drill string in torsional acoustic oscillation in a manner to produce in the string torsional acoustic waves of zero order.

BRIEF DESCRIPTION OF THE DRAWINGS

FIG. 1 illustrates well bore drilling apparatus embodying a drill string communication system according to the invention;

FIG. 2 is an enlarged detail of the rotary table kelly and hoist of the drilling apparatus;

FIG. 7 is an enlarged section through an inertial modulator embodied in the communication system;

FIG. 8 is a section taken on line 8—8 in FIG. 7;

FIG. 9 is a section taken on line 9—9 in FIG. 7;

FIG. 10 is a diagrammatic illustration of the drill string communication system;

FIGS. 11-12 are diagrams of the well bore modulator electronics of the communication system;

FIG. 13 is a diagram of the top side transducer electronics of the communication system;

DESCRIPTION OF THE PREFERRED EMBODIMENTS

Figure 3:
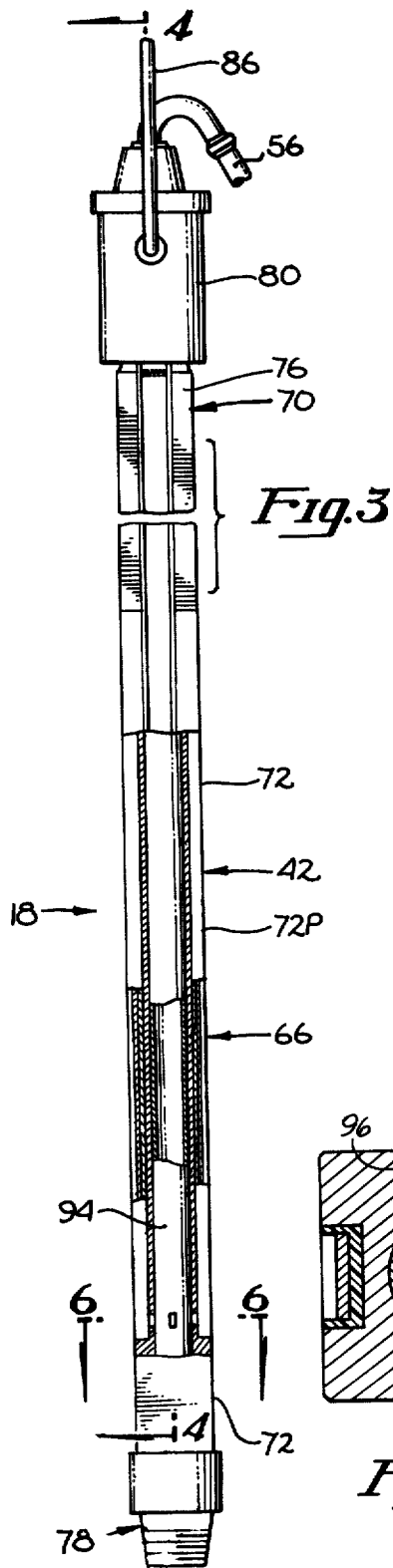
FIG. 3 is an enlarged longitudinal section through the drilling kelly illustrating a magnetostrictive transducer embodied in the kelly.
Figure 4:
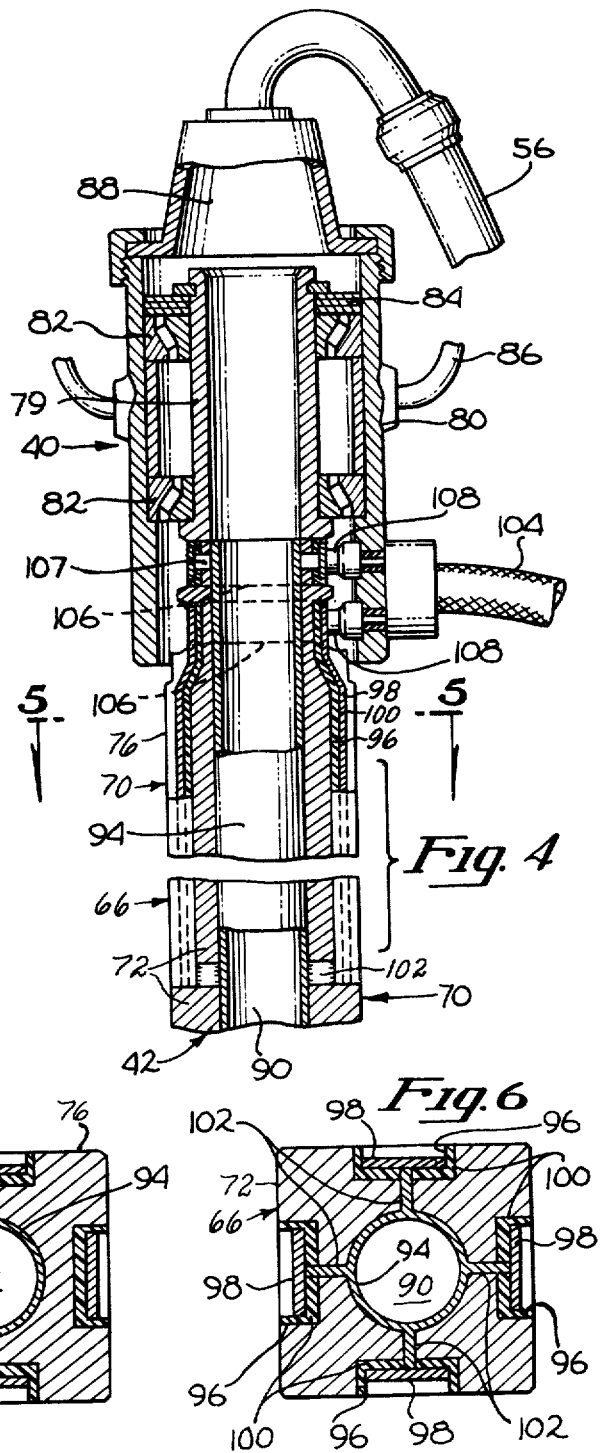
FIG. 4 is a further enlarged section taken on line 4—4 in FIG. 3.
Figure 5:
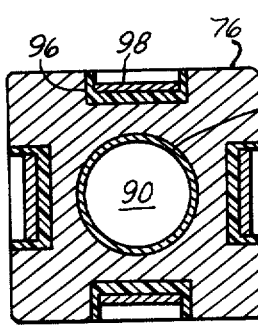
FIG. 5 is an enlarged section taken on line 5—5 in FIG. 4.
Figure 6:
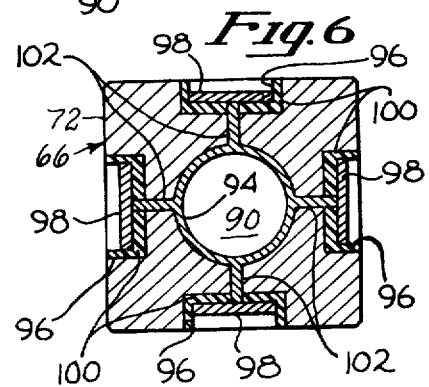
FIG. 6 is an enlarged section taken on line 6—6 in FIG. 3.

Turning now to FIGS. 1-13, there is illustrated a communication system 10 according to the invention for transmitting information through a subsurface pipe 12 from a signal-transmitting station 14 to a signal-receiving station 16 through an intervening length 17 of the pipe which is capable of sustaining torsional acoustic oscillations. The communication system includes wave generating means 18 for inducing in the pipe 12 torsional acoustic waves, modulator means 20 at the signal-transmitting station 14 for modulating the waves with a modulating signal representing the information to be transmitted, and receiving means 24 at the signal-receiving station 16 for demodulating the modulated waves to recover the transmitted information. The particular embodiment of the invention selected for illustration represents the primary application of the communication system. In this case, the pipe 12 is a drill string suspended within a well bore from a surface drilling platform 28. The communication system is utilized to transmit signals along the drill string between the transmitting and receiving stations.

The drilling platform 28 is conventional and hence need not be described in elaborate detail. Suffice it to say that the platform has a derrick 30 mounted on a floor 32 and supporting a hoist 34. Hoist 34 includes a traveling block 36 supported by a cable 38 and carrying a swivel 40. This swivel provides a rotatable connection between the traveling block and the drilling kelly 42 at the upper end of the drill string 12. Kelly 42 extends downwardly through a rotary table 44 on the derrick floor 32 and through the well casing 46 and a blow-out preventer 48 sealed to the wall of the well bore as at 49. The upper end of the drill string 12 proper is connected to the lower end of the kelly. The hoist 34 and rotary table 44 are powered by a draw works 50. A drilling fluid circulation pump 52 delivers drilling fluid or mud under pressure from a mud pit 54 or other fluid reservoir to the swivel 40 through a mud hose 56. The mud flows downwardly through the kelly 42 and the drill string 12 and finally returns to the surface through the well bore, about the outside of the drill string, and then through blow-out preventer 48. The mud flows from the blow-out preventer back to the reservoir through a return line 58.

Drill string 12 is composed of individual drill pipe sections 60 of usually uniform length joined end to end by couplings 62 which are commonly referred to as tool joints. In some cases the drill string may contain additional sections, known as drill collars. Each drill string section 60 normally has a length of approximately 30 feet. Drill collar 63 and a drill bit or cutter 64 are coupled to the lower end of the drill string.

In operation of the illustrated drilling rig, the rotary table 44 is driven in rotation by the draw works 50 to drive the kelly 42 and hence the drill string 12, in its rotary drilling motion. The hoist 34 is operated to support a portion of the drill string weight, such as to maintain the proper drilling pressure on the cutter 64. The mud pump 52 is operated to provide continuous circulation of drilling mud through the well bore to lubricate the cutter and remove debris from the well bore.

The particular acoustic communication system 10 of the invention which has been selected for illustration in FIGS. 1-13 is designed for monitoring selected drilling parameters in the vicinity of the drill bit in order to provide the drilling operator with sufficient information to effectively control the drilling operation. In this case, the signal transmitting station 14 is located at the lower end of the drill string 12, and the signal-receiving station 16 is located at the drilling platform 28. Sensors 65 are shown mounted within the drill collar 63 to sense the drilling parameters to be monitored. These sensors are connected to the modulating means 20 and provide signals representing the monitored drilling parameters. The modulating means processes the sensor output signals to provide a modulating or telemetric signal containing information representing all of the monitored drilling parameters and modulates the acoustic waves induced in the drill string 12 by the wave generating means 18 with the telemetric signal. The modulated waves travel up the string to the surface signal-receiving station 16 where the waves are demodulated by the receiving means 24 to recover the transmitted drilling parameter information.

In certain of its aspects the invention contemplates the use of any acoustic waves capable of modulation by the telemetric signal to be transmitted and capable of propagation through the drill string 12 with sufficiently small acoustic loss and dispersion over the length of the drill string to provide efficient signal reception at the signal receiving station 16. In this regard, it is significant to recall that torsional acoustic waves, however, are superior to all other acoustic wave forms, such as longitudinal and flexural for acoustic signal transmission through a drill string, since torsional waves couple less acoustic energy into the drilling fluid and the wall of the well bore. According to the preferred practice of the invention, especially for depths of which communication becomes difficult, or otherwise impossible, the torsional waves used for signal transmission are torsional acoustic waves of zero order. For a more complete discussion, see our U.S. Pat. No. 3,790,930.

The frequency of the torsional waves is also an important factor in efficient signal transmission through the drill string 12 in that the couplings 62 which join the drill string pipe sections 60 acoustically load the string and the mud about the string attenuates higher frequencies of acoustic oscillation. The jointed string thus tends to pass lower acoustic frequencies with less attenuation than higher frequencies, due to the frequency dependent attenuation of the mud, while the couplings 62 introduce zeros of transmission as shown in FIG. 13A of our U.S. Pat. NO. 3,790,930. According to the preferred practice of the invention, the frequency of the torsional acoustic waves employed for signal transmission is selected to effect wave propagation through the drill string in its base band of transmission. This is the band from zero frequency to the first zero of transmission $f_o$. In this band, the mud produces minimum attenuation of the waves and thus permits maxiumum signal transmission through the string. However, in its broader scope, the invention contemplates acoustic wave propagation through the drill string in its higher pass bands so long as suitable signal reception is possible at the signal receiving station. The preferred torsional wave launching means is a torsional acoustic wave generator including a crossed-field magnetostrictive transducer. An important feature in this regard resides in novel crossed-field magnetostrictive transducer configurations which may be utilized to launch the waves through the drill string as well as to modulate the waves and receive the modulated waves. It should be noted that by employing a bias field coincident with rather than crossed with the signal field, a transducer for launching or receiving longitudinal acoustic waves results, with the same attributes as just mentioned, and is also considered within the scope of the invention. An alternative method of acoustic wave generation contemplated by the invention utilization of the torsional acoustic waves or torsional noise inherently produced in a rotating drill string.

Referring now in greater detail to the communication system of FIGS. 1–13, the means 18 for inducing torsional acoustic waves in the drill string 12 comprises a torsional acoustic wave generator which is embodied in the drilling kelly 42. Broadly, these may be of any suitable form. The preferred generator, however, includes a lower crossed-field magnetostrictive transducer 66 according to the invention, and an upper torque reaction stub 70, as shown in FIG. 3. The transducer and torque reaction stub have tubular bodies 72, 76, respectively, rigidly joined end to end in any convenient way. These tubular bodies have a uniform, non-circular, usually square, cross section matching that of a conventional drilling kelly and together constitute the drilling kelly 42.

The lower end of the kelly 42, that is, the lower end of transducer body 72, is coupled to the upper end of the drill string 12 by a tool joint 78. Swivel 40 is rotatably coupled to an extension 79 at the upper end of the kelly, that is, to the upper end of the upper reaction stub body 76. As shown in FIGS. 1–14, this swivel has an inverted cup-like housing 80 receiving the upper end of the stub body extension 79. The housing is attached to the extension by a pair of combined radial and thrust bearings 82. A seal ring 84 provides a liquid tight seal between the housing and extension. The kelly 42 is thus restrained against longitudinal movement but is free to rotate relative to the swivel housing 80. At the upper end of the housing is a lifting bail 86 by which the housing and hence the kelly 42 and drill string 12, are suspended from the travelling block 36 of hoist 34.

The mud hose 56 connects to the swivel housing 80 and opens to the interior housing chamber 88 above the seal 84. Extending centrally through the kelly 42 is a mud passage 90 through which drilling mud entering the chamber 88 through the mud hose 56 flows to the central mud passage in the drill string 12.

As noted above, the torsional wave transducer 66 is a crossed-field magnetostrictive transducer. Transducers of this general class are known in the art. Such a transducer requires an elongated body of magnetostrictive material and means for establishing two magnetic fields within the body. One field is an axial field whose field lines extend longitudinally through the body. The other field is a transverse field whose field lines extend circumferentially through the body. One field is commonly referred to as a bias field and the other as a signal field. Either field may serve as the bias field and the other field as the signal field. The interaction of the bias and signal fields produces a torsional strain in the body which may be caused to fluctuate in such a way as to induce torsional oscillations in the body by varying, at the proper frequency, either or both the bias and signal fields. In this mode, the transducer is either a torsional wave generator or modulator, i.e., signal transmitter. The transducer is also capable of operating in an acoustic signal receiving mode. Thus a torsional strain within the transducer body with only one of the transducer fields present induces in the other field conductors a voltage, at the conductor terminals, proportional to the rate of strain. The communication system of FIGS. 1–13 employs the magnetostrictive transducer 66 as both a torsional wave generator and a signal receiver.

In such a crossed-field magnetostrictive transducer, the fields in the longitudinal and circumferential directions may be established in various ways. For example, the field in the circumferential direction may be established by passing a current longitudinally through the transducer body or through a conductor within the body. The field in the longitudinal direction may be established by passing a current through a coil surrounding the body. Alternatively, either field may be established by constructing the transducer body of a magnetically remanent magnetostrictive material which is permanently magnetized in the proper direction. The field in the longitudinal direction may also be established by permanent magnets along the transducer.

The crossed-field magnetostrictive transducer 66 embodied in the well drilling apparatus of FIGS. 1–13 is designed for remanent operation. To this end the transducer body 72 has a major central portion 72P constructed of a magnetically remanent magnetostrictive material. In this instance the material is biased with a remanent field in the longitudinal direction.

Fixed to and extending the full length of the kelly mud passage 90 is a sleeve 94 of copper or the like which provides an inner signal-field conductor of the transducer. Fixed within channels 96 in the four sides of and extending the full length of the kelly 42 are strips 98 of copper or the like which provide outer signal-field conductors of the transducer. These outer conductors are electrically insulated from the transducer body 72 by electrical insulation 100. The lower ends of the inner and outer conductors 94, 98 are electrically connected at 102. The upper ends of the conductors are electrically connected to the leads of a cable 104 through collector rings 106 surrounding the upper end of the kelly 42 and collector brushes 108 carried by the swivel housing 80. The upper collector ring is assured good electrical contact to the inner conductor by means of copper rivits 107. The lower collector ring is in direct electrical contact with the outer conductors.

As will be explained in more detail presently, a driving signal is applied to the transducer signal-field conductors 94, 98, through the cable 104. This driving signal produces in the conductors a fluctuating current which induces in the transducer body 72P a circumferential magnetic signal field that interacts with the longitudinal remanent bias field of the body to produce an alternating torsional strain in the body. Such alternating torsional strain, in turn, propagates as a torsional wave downwardly through the drill string 12 to the subsurface signal transmitting station 14. The torsional waves are modulated at the signal transmitting station 14 with a telemetric signal representing the drilling parameters to be monitored and returned upwardly through the drill string to the surface, in the manner to be explained presently. These modulated waves are received by the transducer 66 and then demodulated to recover the transmitted signal.

It will be recalled from the earlier description that the invention, in its broader aspects, contemplates any acoustic waves capable of propagation through the drill string 12 and capable of modulation by the telemetric signal to be monitored to achieve effective signal transmission from the subsurface signal transmitting station 14 to the surface signal receiving station 16.

It will be further recalled, however, that the preferred waves are torsional acoustic waves of zero order and of the proper frequency to effect wave propagation through the drill string 12 in its base band. In this latter regard, attention is directed to FIG. 13A of our U.S. Pat. No. 3,790,930.

Returning again to the torsional wave transducer 66, the transducer body 72 will be recalled to have a torque reaction stub 70 which provides an acoustic reaction termination at the upper end of the transducer. While this upper reaction stub or termination may conceivably be designed to serve as an absorbing termination, the particular termination shown is assumed to be a reflecting termination.

The theory of reflecting terminations is well understood and hence need not be explained in great detail. Suffice it to say that the correct length of a reflecting termination depends on the nature of the reflections occuring at the upper end of the termination. For example, if the upper end of the termination is open, with no acoustic connection to any structure, the end constitutes a node for torque and an antinode for torsional displacement. In this case, the optimum termination length is an odd number of quarter wave lengths of the acoustic waves to be reflected. On the other hand, if the end of the termination is acoustically rigid, that is, anchored to a very large mass with an acoustic impedance large relative to that of the transducer and termination, the end of the termination is an antinode for torque and a node for torsional displacement. In this case, the optimum termination length is an even number of quarter wave lengths of the aq ustic waves to be reflected. For intermediate cases, the termination must have an intermediate length determined by the acoustic conditions at the end of the termination. Obviously, the torque reaction stub or termination 70 represents such an intermediate case and must be dimensioned accordingly.

It will be understood from the description to this point that the transducer 66 is excited with a driving signal of the proper frequencies to launch torsional acoustic waves of zero order downwardly through the drill string 12 in the base band of the drill string. The manner in which this driving signal is generated will be explained presently. Suffice it to say here that the driving signal is applied to the transducer through the cable 104, collector brushes 108, collector rings 106 and the upper rivets 107. The waves are modulated at the subsurface signal transmitting station 14 by the modulating means 20 and returned to the signal receiving station 14, to provide at the receiving station modulated waves containing information representing the drilling parameters to be monitored.

The present invention utilizes a reaction type wave modulation means 20 for modulating the acoustic waves in the drill string. Any of a variety of such acoustic wave modulators 20 may be employed. FIGS. 7–9 illustrate, for example, an inertial reaction modulator, which utilizes a type of magnetic clutch, well known per se. This clutch has a central tube or pipe 110 coupled into the drill string. Juxtaposed to this pipe 110, e.g., surrounding its upper end, is a relatively massive inertial cylinder 118.

For the preferred torsional wave species of the system, inertial cylinder 118 can be rotatably supported on and restrained against movement along the pipe 110 by combined radial and thrust bearings 120. Seals 122 seal the ends of cylinder to the pipe. Between its ends, the inertial cylinder 118 is internally enlarged to define an annular chamber 124 between the cylinder and the pipe 110. This chamber is filled with a magnetic fluid 126, such as a mixture of oil and powdered iron. Contained in four uniformly spaced longitudinal slots 128 in the portion of the modulator pipe 110 within the chamber 124 is a drive coil 130. As shown best in FIG. 8, the conductors of the drive coil extend lengthwise of the slots 128. Moreover, as indicated by the + and − signs in the figure, the drive coil is wound in such a way that when a voltage is impressed across the coil, current flows in one direction through the conductors in two diametrically opposed slots and in the opposite direction through the conductors in the remaining two diametrically opposed slots.

It will now be understood that the modulator structure described thus far constitutes, in effect, a variable drive electromagnetic clutch. Thus, when the drive coil 130 is deenergized, the pipe 110 and inertial cylinder 118 and capable of relatively free relative rotation. Energizing of the drive coil produces a magnetic coupling between the pipe and cylinder which resists relative rotation of the pipe and cylinder with a varying reaction torque proportional to the current flow through the drive coil.

Surrounding and fixed to the modulator pipe 110 below the inertial cylinder 118 is an annular circuit housing 132 containing the driving circuit 134 for the modulator drive coil 130. The drive coil is connected to the output of the circuit through leads 135. Modulator driving circuit 134 (FIG. 11) will be described shortly.

Between the modulator 20 and the drill collar 63 is a lower reactance termination 136. This reactance termination comprises a section of drill collar of the proper mass and length to constitute a reflecting termination for the torsional acoustic waves launched downwardly through the drill string 12 by the topside transducer 66. The earlier discussion relative to the topside reflecting termination 70 applies with equal force to the terminaton 136. The modulator pipe 110 and lower termination are connected end to end to the drill string 12 by conventional tool joints. In this regard, it will be observed that the latter pipe and termination transmit drilling torque to the drilling cutter 64 and support the weight of the drill string below and thus must be designed to have sufficient torsional and tensile strength to withstand these loads. Extending through the pipes are mud passages which form a continuation of the drill string mud passage.

As noted earlier, it is desirable or necessary during a drilling operation to monitor several different drilling parameters in the vicinity of the drilling cutter 64. Some of these parameters were listed in the earlier description and thus need not be repeated here. Suffice it to say that the sensors 65 are selected and arranged within the drill collar 63 to be responsive to the particular drilling parameters to be monitored. In this regard, it is significant to note that sensors for this purpose are well-known and available on the commercial market. Accordingly, it is unnecessary to describe the sensors except to say that each sensor produces an electrical output respresenting its respective drilling parameter. The several sensors 65 are electrically connected through leads 146 to the input of the modulator driving circuit 134.

The modulator driving circuit 134 will be explained presently. Suffice it to say here that the circuit effectively combines the several outputs from the drilling parameter sensors 65 and produces a telemetric signal containing information representing all the drilling parameters. This telemetric signal is processed to produce a corresponding modulator driving signal which is applied through leads 135 to the modulator drive coil 130 and produces a corresponding fluctuating magnetic coupling between the inner pipe 110 and outer inertial cylinder 118 of the modulator 20. As a consequence the torsional acoustic waves propagating downwardly through the drill string 12 and the modulator pipe 110 to the lower reaction termination 136 and then reflected from the termination upwardly through the pipe and drill string are modulated to contain information representing the drilling parameters being monitored. Thus, an increase in the magnitude of the modulator driving signal produces a corresponding increase in the magnetic coupling between the modulator pipe and inertial cylinder, thereby increasing the effective torsional mass of the pipe and retarding the phase as well as altering the amplitude of the waves then traveling through the modulator. Similarly, a decrease in the magnitude of the driving signal produces a corresponding reduction in the magnetic coupling between the modulator pipe and inertial cylinder thereby reducing the effective torsional mass of the pipe and advancing the phase as well as altering the amplitude of the waves then traveling through the modulator. In ultimate effect, the pipe experiences an acoustic reaction force, in this case a torque, generating modulated acoustic waves from acoustic waves already propagating along the length of the drill string pipe. As will be clear from the foregoing, the drive coil leads 135 mentioned just above are connected to an electric circuit which varies the current through these leads in accordance with a signal input from the sensor, the modulated acoustic waves will be produced by energy extracted from the passing wave. Also in this connection, it will be seen that the oncoming torsional acoustic wave propagating along the pipe sees the modulator as a varying acoutic impedance, and in accordance with well known transmission line theory, is partially reflected and partially transmitted by the modulator to a degree that varies in accordance with the modulating signal. Thus waves modulated at the transducer can travel oppositely to the direction of the oncoming wave, in the same direction as the oncoming wave, and of course in both directions relative thereto. Of these modulated waves, those that travel downwardly to the reactance termination are thereby reflected back upwardly.

The modulated waves that travel back upwardly through the drill string 12 to the surface signal receiving station 16 produce a corresponding fluctuating torsional strain in the magnetostrictive body 72 of the transducer 66, therby inducing in the transducer field conductors 94, 98 a fluctuating voltage containing information representing the transmitted telemetric signal. As explained below, the voltage signal from the transducer is processed by a combined transducer driving-receiving circuit at the surface to recover the transmsitted information representing the drilling parameters being monitored.

Figure 14:
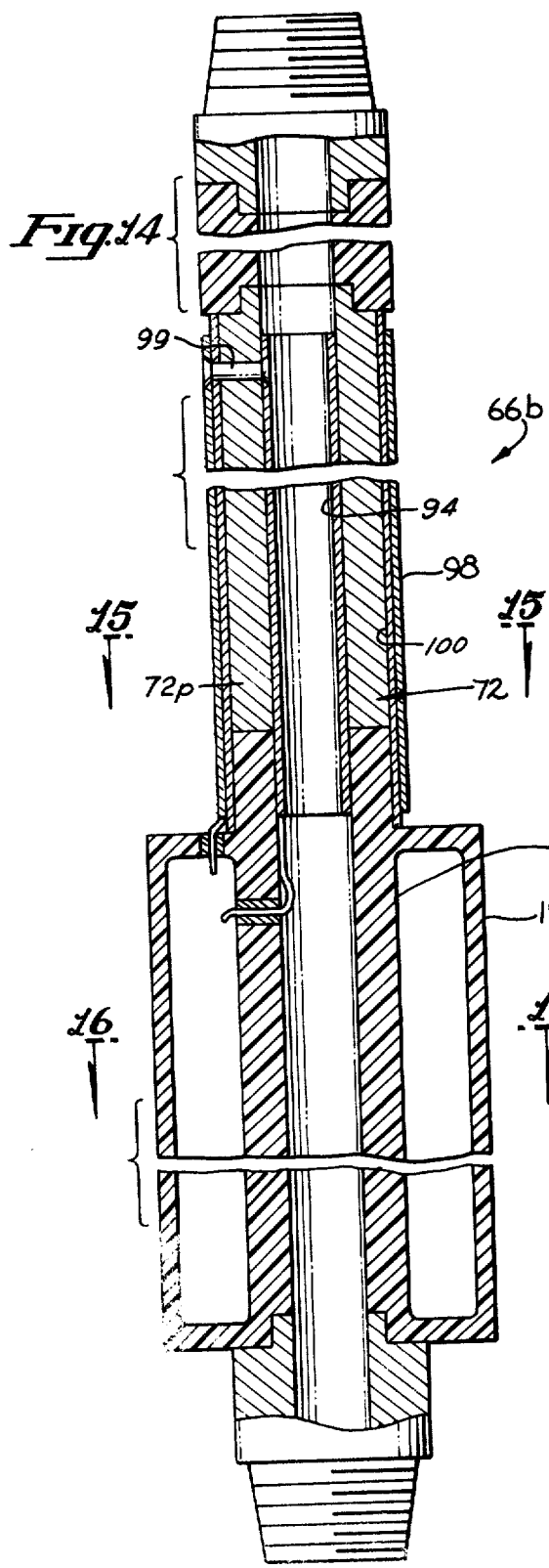
FIG. 14 illustrates a modified crossed-field magnetostrictive transducer according to the invention.
Figure 15:
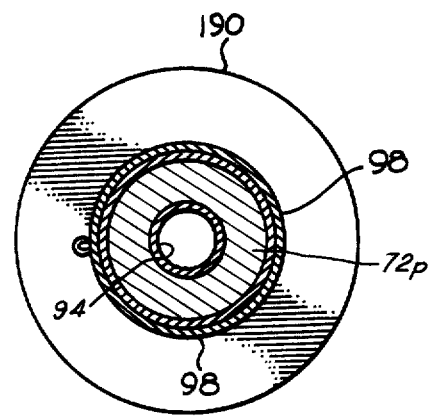
FIG. 15 is a section taken on line 17—17 in FIG. 14.
Figure 16:
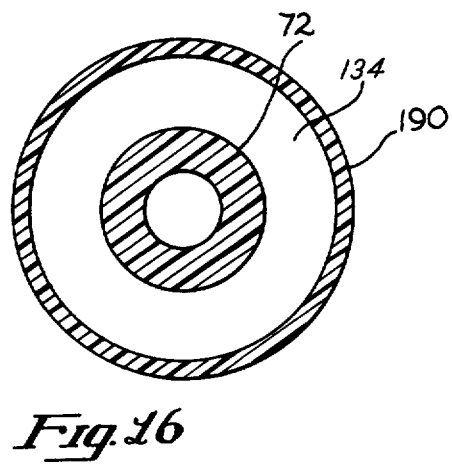
FIG. 16 is a section taken on line 18—18 in FIG. 14.

A variety of torsional acoustic modulators, other than the inertial modulator described above may be employed in the present drill string acoustic communication system. By way of example, a crossed-field magnetostrictive transducer similar to the top side transducer 66 may be employed as a modulator. In this regard, attention is directed to FIGS. 14–16 illustrating a modified sub-surface magnetostrictive transducer 66b according to the invention which may be utilized as the modulator 20, and which will be described later.

Turning now to FIG. 11 there is illustrated the general arrangement of the modulator driving circuit 134 which is contained in the modulator circuit housing 132. As noted, this circuit converts the outputs from the drilling parameter sensors 65 to a coded driving signal for the modulator 20. This driving circuit includes a power source (not shown), such as a battery, an encoder 148 and modulator driving circuitry 150. The encoder is connected to the drilling parameter sensors 65 to receive the several sensor outputs and processes these outputs to produce a telemetric signal containing information representing all of the sensor outputs. This telemetric signal is applied to the driving circuit 150 which processes the signal in such a way as to produce a inertial modulated driving signal for the modulator drive coil 130. The operation as described above then follows.

The driving circuit 134 may utilize various known signal processing techniques for converting the outputs from the drilling parameter sensors 65 to a suitable driving signal, for the inertial modulator 20 or for the later described sub-surface crossed-field magnetostrictive transducer 66b (FIGS. 14-16) when employed as a modulator. FIG. 12 illustrates a possible signal processing technique for this purpose. The illustrated signal processing technique is well-known and understood so that an elaborate description of the same is unnecessary.

Suffice it to say that FIG. 12 shows a binary phase coded system, applicable to either of the modulators of FIGS. 7-9, or 14-16. The encoder 148 is a binary digital encoder for converting the analog outputs from the sensors 65 to a binary digital signal containing information representing the outputs of all the sensors. The modulator driving circuit 150 is a power amplifier which amplifies this binary digital signal to the proper strength for driving the modulator 20 either that of FIGS. 7-9 or that of FIGS. 14-16.

Considering now the system of FIG. 10, there is connected to the topside transducer 66 a driving and receiving electronic system, comprising means 154 (FIG. 13) for separating the driving signal to and the information signal from the transducer. The means 154 shown in FIG. 13 is a hybrid juction having one branch connected to the transducer field conductors 94, 98. A second branch of the hybrid is connected to a transducer driving circuit 156 including a high power drive source 158. Connected to the third branch of the hybrid is a transducer receiving circuit 160 including an amplifier 162, phase detector 164, digital decoder 166, and an output display or recorder 168. The reference input of the phase detector 164 is connected to the source 158 through an attenuator 170.

The operation of transducer 66 and driving and receiving circuit 152 will be immediately evident to those versed in the art. Thus, the hybrid junction 154 feeds the high power driving signal from the source 158 to the transduceer field conductors 94, 98 to drive the transducer to launch the earlier described torsional acoustic waves downwardly through the drill string 12. At the subsurface signal transmitting means station 14, these waves are modulated to contain the information representing the telemetric signal to be transmitted and are returned upwardly through drill string 12. These modulalted waves produce modulated fluctuating torsional strain in the transducer body 72 and thereby corresponding fluctuating voltage signal in the transducer field conductors 94, 98. The hybrid junction 154 feeds this voltage signal to the receiving circuit 160. This signal is amplified by amplifier 162 and its phase is compared to the phase of the transducer driving signal in the phase detector 164 to provide an output representing the telemetric signal. The digital decoder 166 reduces the output of the phase detector to discrete output signals representing the various monitored drilling parameters. These output signals are then displayed or recorded as drilling parameter information by the display or recorder 168.

Turning next to a description of the magnetostrictive transducer used as a modulator, from FIGS. 14-16 it will be seen that the subsurface transducer 66b is similar to the topside transducer 66 and differs from the latter in that transducer 66b is inverted and includes a circuit housing 190 surrounding the lower end of the transducer body 72. Within this housing is the electronic circuitry 134 of FIG. 12 for processing the outputs of the drilling parameters sensors 65 to produce a modulated transducer driving signal containing information representing the drilling parameters being monitored. Also the outer transducer field conductor 98 is a copper sleeve, rather than bars fitting in slots in the transducer body as in the topside transducer 66. Transducer 66b may employ such an outer conductor sleeve, of course, since it is not required to couple to the driving torque of the rotary table 44, as with the topside transducer. The inner copper conductive sleeve 94 is as before, as is the remanent magnetostriction body 72p. Sleeves 94 and 98 are electrically connected at the top by copper rivet 99, and thus comprise a winding providing a circumferential electromagnetic field in the tubular magnetostriction body 72p. Also as in transducer 66, the body 72p will be understood to provide its cross field bias in the longitudinal direction by remanence.

To act as a modulator, the transducer 66b must develop a reaction torque in the presence of torsional acoustic waves incident on it. The waves incident on the transducer cause a voltage to be induced in the transducer signal field conductors, as discussed earlier in describing the transducer as a receiver of acoustic waves. If these field conductors are connected to a circuit of finite impedance, e.g., the illustrative circuit of FIG. 12, a current will flow through this circuit and the field winding 94, 98. But the current flowing through the field winding causes a torsional strain to be induced in the transducer, as discussed earlier in the description of the transducer as a generator of acoustic waves. This torsional strain constitutes a reaction torque. The magnitude of this torque is controlled by the electrical impedance of the circuit to which the transducer field winding is connected. Thus, if the modulator circuit is so constituted as to cause the impedance of the circuit connected to the signal field conductors 94, 98 to vary in accordance with the signal from the sensors, a corresponding variation in the reaction torque occurs and a modulated acoustic wave is produced.

The communication systems described to this point are designed primarily for relatively continuous monitoring of selected drilling parameters. It should be noted in this regard that in some drilling applications it may be possible to communicate effectively through the drill string 12 while drilling is actually in progress, i.e., while the string is being driven by the rotary table 44. In other cases, effective communication may require cessation of the drilling operation and release of the rotary table gripping jaws from the drill string.

In communication systems described to this point, an electrically driven transducer has been employed to generate the torsional acoustic waves in the drill string. As noted earlier, however, the communication system may utilize as an information carrier the noise or acoustic waves inherently generated in a drill string during a drilling operation. Such noise consists of relative broad band random noise and narrow frequency bands both of which may be modulated to transmit information through the drill string. The communication system of FIG. 10 may be operated in this fashion by using the transducer 66 at the drilling platform only as a receiving transducer and by modulating the drilling noise by means of modulator 20, at the same time eliminating the lower drill string acoustic termination 136. In this operation a selected frequency band of the drilling noise is modulated and the topside transducer receiving circuit is provided with a filter for passing only the selected frequency band. This selected frequency band of the output signal from the surface transducer 66 is processed to recover the transmitted information.

Those versed in the art will understand at this point that the drill string in the various disclosed inventive embodiments constitutes an acoustic transmission line and that the various elements in the drill string, such as tool joints, acoustic wave generator and modulator, and the like, constitute perturbations in the string at which occur a complex action of partial reflection and partial transmission of the acoustic waves traveling through the drill string. However, it can be demonstrated by well-known mathematical transmission line analysis techniques that during operation of the present well bore communication system, the several acoustic wave reflections and transmissions result in transmission from the signal transmitting station to the signal receiving station of net or resultant modulated acoustic waves containing information representing the signal impressed on the modulator or transducer at the transmitting station and hence also representing the drilling parameter or other information to be transmitted. These net or resultant modulated acoustic waves are demodulated at the signal receiving station in the manner heretofore explained to recover the transmitted information.

From the foregoing description, it will be understood that various changes in the detailed construction and arrangement of the parts constituting the telemetering system for oil wells of the present invention may occur to those skilled in the art without departing from the spirit and scope of the present invention. Accordingly, it is to be understood that the foregoing description is considered to be illustrative of, rather than limitative upon, the invention as defined by the appended claims.

What is claimed is:

1. In an acoustic signal modulation and transmission system in well drilling equipment, the combination of:
   a drill string pipe adapted to the propagation of acoustic waves along its length through the substance of said pipe,
   a tubular member, having a longitudinal passage, connected into and functioning mechanically and acoustically as a segment of said drill string pipe,
   a modulating means in juxtaposition to said tubular member adapted to couple to said tubular member in a manner to cause said member to experience an acoustic reaction force in reaction to acoustic waves propagating within the substance of said drill string pipe, and
   said modulating means being responsive to a modulating signal applied thereto to vary the magnitude of said coupling and thereby said acoustic reaction force, whereby to generate within the substance of said tubular member modulated acoustic waves derived from acoustic waves already propagating along the length of said drill string pipe.

2. The system of claim 1, including means causing said modulated acoustic waves to travel along said drill string pipe in the same direction as the direction of travel of said acoustic waves already propagating along the length of said pipe.

3. The system of claim 1, including means causing said modulated acoustic waves to travel along said drill string pipe in the direction opposite to the direction of travel of said acoustic waves already propagating along the length of said pipe.

4. The system of claim 1, including means causing said modulated acoustic waves to travel along said drill string pipe in both the same direction as, and the opposite direction to, the direction of travel of said acoustic waves already propagating along the length of said pipe.

5. The system of claim 1, wherein the acoustic waves propagated along said drill pipe are torsional waves, and wherein said modulating means is adapted to couple to said tubular member in such a manner that the reaction force experienced by said tubular member is a torque about the longitudinal axis of said tubular member.

6. The system of claim 1, wherein said juxtaposed modulating means embodies an inertial reaction mass.

7. The subject matter of claim 5, wherein said juxtaposed modulation means embodies an inertial reaction mass rotatable relatively to said tubular member.

8. The subject matter of claim 6, wherein said modulating means includes an electromagnetic clutch controlled by said modulating signal.

9. The system of claim 1, including:
   an electroacoustic transducer with means affording a bias field linked to said tubular member,
   said tubular member comprising a part of said transducer and being composed at least in part of a material that experiences a change in mechanical strain in the presence of a change in electromagnetic field, and conversely, produces a change in electromagnetic field in the presence of a change in mechanical strain,
   said juxtaposed modulating means comprising a field means affording a field linked to said tubular member, and
   an electrical modulating circuit connected to said field means to control said reaction force.

10. The system of claim 9, wherein the acoustic waves propagated along said drill pipe are torsional waves, and wherein said field means produces a field crossed with said bias field, whereby the reaction force experienced by said tubular member is applied as a torque.

11. The system of claim 1, including:
   an electroacoustic transducer with means affording a magnetic bias field linked to said tubular member,
   said tubular member comprising a part of said transducer and being composed at least in part of a material that experiences a change in mechanical strain in the presence of a change in magnetic field, and conversely, produces a change in magnetic field in the presence of a change in mechanical strain,
   said juxtaposed modulating means comprising a field winding disposed in inductively coupled relation to said tubular member, and an electrical modulating circuit connected to said winding to control said reaction force.

12. The system of claim 11, wherein the acoustic waves propagated along said drill pipe are torsional waves, and wherein said field winding produces a magnetic field crossed with said magnetic bias field, whereby the reaction force experienced by said tubular member is applied as a toque.

* * * * *